United States Patent [19]

Rasmussen

[11] Patent Number: 4,963,212

[45] Date of Patent: Oct. 16, 1990

[54] METHOD FOR MAKING A COMPOSITE BODY

[75] Inventor: George Rasmussen, Gredstedbro, Denmark

[73] Assignee: Ploughmann & Vingtoft, Copenhagen K, Denmark

[21] Appl. No.: 238,892

[22] Filed: Aug. 31, 1988

[30] Foreign Application Priority Data

Aug. 31, 1987 [DK] Denmark ............................ 4551/87

[51] Int. Cl.[5] ............................................ B32B 31/18

[52] U.S. Cl. .................................. 156/222; 156/250; 156/254; 156/256; 156/264; 144/344; 144/345; 144/346; 144/349; 144/350

[58] Field of Search ............... 156/250, 254, 256, 264, 156/222; 144/344, 345, 346, 349, 350

[56] References Cited

U.S. PATENT DOCUMENTS

| | | | |
|---|---|---|---|
| 3,027,923 | 4/1962 | Schreiber | 144/256 |
| 3,063,483 | 11/1962 | Shumacher | 144/266 |
| 3,277,938 | 10/1966 | Allan | 156/222 |
| 3,312,582 | 4/1967 | Allan et al. | 156/222 |
| 4,210,182 | 7/1980 | Danko | 144/317 |
| 4,399,754 | 8/1983 | Emery | 156/264 |
| 4,536,427 | 8/1985 | Kohn | 156/264 |
| 4,731,145 | 3/1988 | Senzani | 156/264 |

FOREIGN PATENT DOCUMENTS

| | | | |
|---|---|---|---|
| 2908926 | 5/1971 | Fed. Rep. of Germany | 156/264 |
| 360706 | 6/1983 | Fed. Rep. of Germany | 156/264 |
| 867740 | 2/1985 | Fed. Rep. of Germany | 156/264 |
| 3516465 | 11/1986 | Fed. Rep. of Germany | 156/264 |
| 1070583 | 4/1974 | France | 156/264 |
| 2413188 | 1/1978 | France . | |
| 1016160 | 5/1983 | U.S.S.R. . | |
| 1471027 | 4/1977 | United Kingdom . | |

OTHER PUBLICATIONS

Patent Cooperation Treaty, International-Type Search Report.

EPC Patent Application 0211810.

Danish Patent Application No. 2222/83, dated Mar. 18, 1983.

Danish Patent Application No. 1300/84, dated Feb. 29, 1984.

*Primary Examiner*—Caleb Weston

*Attorney, Agent, or Firm*—Price, Heneveld, Cooper, DeWitt & Litton

[57] ABSTRACT

A furniture frame part or the like is made from a first, planar laminate of wood or other material. This laminate is bent so as to form a shaped member of single curvature. The shaped member is cut into slices in a direction transverse to the generatrices of the curvature, and from these slices a second laminate is made. This second laminate is bent in a direction so as to form another curvature with generatrices extending generally transversely to the first mentioned generatrices, whereby a furniture frame part or another composite body of double curvature may be made.

14 Claims, 3 Drawing Sheets

METHOD FOR MAKING A COMPOSITE BODY

BACKGROUND OF THE INVENTION

1. Field of the Invention

The present invention relates to a method of making a composite body, which may, for example, form or form part of a furniture frame or another supporting and/or decorative structure.

2. Description of the Prior Art

It is well-known to make furniture frames or frame parts from wood laminates comprising mutually superposed or superimposed laminae of wood and intermediate layers of a settable or hardenable binder or glue. When the laminae have been mutually superposed, the laminate may be bent or curved to a desired shape prior to setting or hardening of the binder or glue. The laminate may, however, be bent or curved in a single direction only, that is in a direction transverse to the layers or laminae. It has also been proposed to combine such bending with twisting. However, the shapes which may be made by conventional wood laminate shaping techniques are seriously limited.

SUMMARY OF THE INVENTION

The present invention provides a method of making an elongated, composite body which may be given a shape of double curvature, if desired.

Thus, the present invention provides a method of making a composite body, said method comprising making a first laminate from mutually superposed first laminae of material and intermediate layers of a first binding material, slicing said first laminate in a direction transverse to said first laminae, so as to produce second laminae, and making a second laminate from said second laminae by mutually superposing the sam with intermediate layers of a second binding material.

It is understood that the composite body made by the method according to the present invention will comprise a plurality of substantially parallel extending strings of material having a small rectangular or parallelogram-shaped transverse cross section, which are interconnected by first and second layers of binding materials. The first and second layers of binding material or glue, which are preferably of the same type, may, for example, be of a kind which may be softened, for example by heating and/or wetting. In such a case, an elongated composite body which has been made by the method according to the present invention may later be bent or curved to any desired shape of single or double curvature.

In the preferred embodiment, however, prior to setting or hardening of the first layer of binding material and prior to slicing, the first laminate is bent, wherein the direction of slicing is transverse to first generatrices of curvature formed by such bending. Similarly, prior to setting or hardening of the second layer of binding material, the second laminate may be bent, so as to form curvature thereon having second generatrices extending transversely to said first generatrices. As a result, a composite body being made by the method according to the present invention may be given a desired shape of single or double curvature while the composite body is being made and before setting or hardening the binding material or glue, which may for example, be of the thermo-setting type. The subject bending operations may then take place in suitable molds or shaping tools in which pressure and heat is imparted to the first and second laminates, respectively.

The first laminate may be sliced in a direction forming an acute angle with the first laminae, whereby the composite body produced will include a plurality of strings or columns of material having a parallelogram-shaped transverse cross section. In the preferred embodiment, however, the first laminate is sliced in a direction substantially at right angles to the first laminae, whereby the said strings of material will obtain a substantially rectangular cross section. The first laminae and/or the second laminae may have different thicknesses, if desired. However, the thickness is preferably the same for all of the first laminae, and this is preferably also the case for all of the second laminae. The thickness of each of th first laminae may differ from or be the same as the thickness of the second laminae. In the latter case the strings of material present in the composite body formed will obtain a uniform, substantially square cross section.

In principle, the said first laminae may be made from one or more of any suitable, bendable materials such as plastics material and metal, and the first laminate may include fibers, which may for example, be reinforcing fibers incorporated in laminae of plastics material and/or in the building materials. When the fibers in the first laminate extend in substantially the same direction, the first laminate is preferably sliced substantially in the direction of said fibers, whereby the fibers will extend in the longitudinal direction of the plurality of strings of material present in the composite body formed. In the preferred embodiment of the method according to the invention, at least some, and preferably the majority, of said first laminae are made from wood, and said fibers are wood fibers. For the sake of strength and/or decorative purposes some of the said first laminae may be made from metal or plastic material having a color different from the color of the wood laminae.

The thickness of the slices or the second laminae which are cut from the first laminate may be chosen in dependency of the extent to which the second laminate is to be curved or bent. In one example of the present invention, the thickness of each second laminate is normally 1 to 5 mm.

The method according to the present invention may be used for making composite bodies of a great variety of shapes of single or double curvature and for any of a number of purposes. Such composite bodies may, for example, constitute or form part of supporting and/or decorative structures, portals, frames of any kind, etc. It is believed at present that the method according to the invention is especially advantageous within the furniture industry for use in making furniture frame structures or parts thereof.

The present invention also provides a composite body being a laminate of mutually superposed first laminae of material and intermediate layers of a first binding material, said laminate being divided into co-extending second laminae extending transversely to said first laminae with intermediate layers of a second binding material.

BRIEF DESCRIPTION OF THE DRAWINGS

The invention will now be further described with reference to the drawings, wherein.

Figure 1:
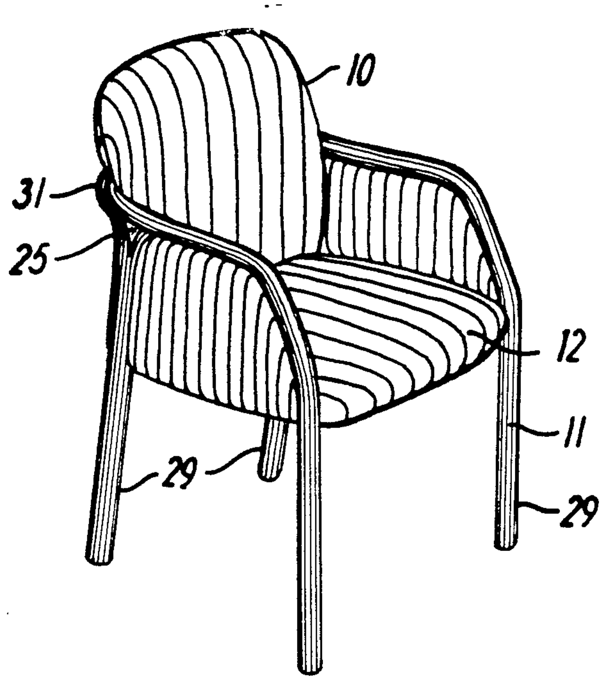
FIG. 1 is a front perspective view of a first chair having frame parts made by the method according to the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein, are not to be considered as limiting, unless the claims expressly state otherwise.

FIG. 1 shows a chair 10 having exposed frame portions 11, and which is produced by the method according to the present invention. The frame structure 11 may further comprise concealed frame portions (not shown) which are covered by upholstery 12, and are connected to the exposed frame portions 11 in any conventional manner.

Figure 2:
FIG. 2 is a side elevational view of a planar wood laminate.
Figure 3:
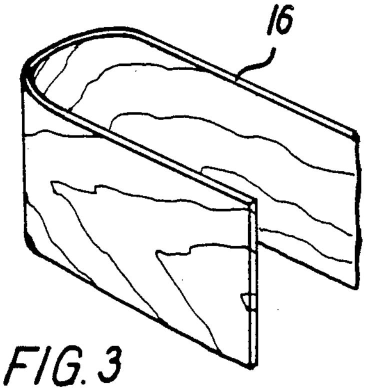
FIG. 3 is front perspective view of the laminate of FIG. 2 bent into a substantially U-shaped member.

The exposed frame portions 11 shown in FIG. 1 may be made from a flat or planar piece of a wood laminate 13 as that shown in FIG. 2. The laminate 13 is made up of a number of planar, wood laminae or veneers 14 and intermediate layers 15 of a binder or glue. The planar, wood laminate 13 shown in FIG. 2 may be bent so as to form a member 16 as that shown in FIG. 3 which may be substantially U-shaped as shown, or which may be bent into any other desired shape of single curvature by use of a conventional bending technique. Thus, the bending may take place in a press tool or press mold comprising heating means for heating the laminate 13 during the shaping operation. The laminate 13 is preferably bent or shaped prior to hardening or setting the layers 15 of binder or glue, which may be of the thermosetting type. This means that heating of the bent laminate 13 in the press tool or mold by the said heating means causes the glue or binder of the laminate 13 to set after the laminate 13 has been shaped into the U-shaped member 16.

After bending, the U-shaped member 16 is sliced or cut longitudinally into relatively thin slices 17 by means of a conventional cutting or sawing tool. As seen from the end view shown in FIG. 9, each of these slices is made from juxtaposed, co-extending wooden string members 18 having a substantially rectangular or square cross section and being bonded together by the binder or glue layers 15. It is to be understood that the laminate 13 is preferably bent transversely to the longitudinal direction of the fibers of the wood material in the wood laminae 14, which means that in the slices 17, the wood fibers extend substantially in the longitudinal direction of the string members 18. A plurality of the slices 17 are then mutually superimposed with intermediate layers of a hardenable or settable binder or glue to form a second laminate, which as discussed in detail below, may be bent or curved in a direction transversely to the plane of such laminae by using a procedure similar to that used for shaping the member 16 shown in FIG. 3. Thus, any desired shape of double curvature or three-dimensional part may be obtained.

Figure 4:
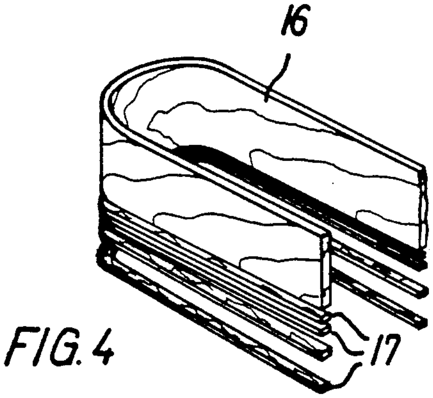
FIG. 4 is a front perspective view of the U-shaped member of FIG. 3 shown sliced so as to provide a plurality of U-shaped laminae.
Figure 5:
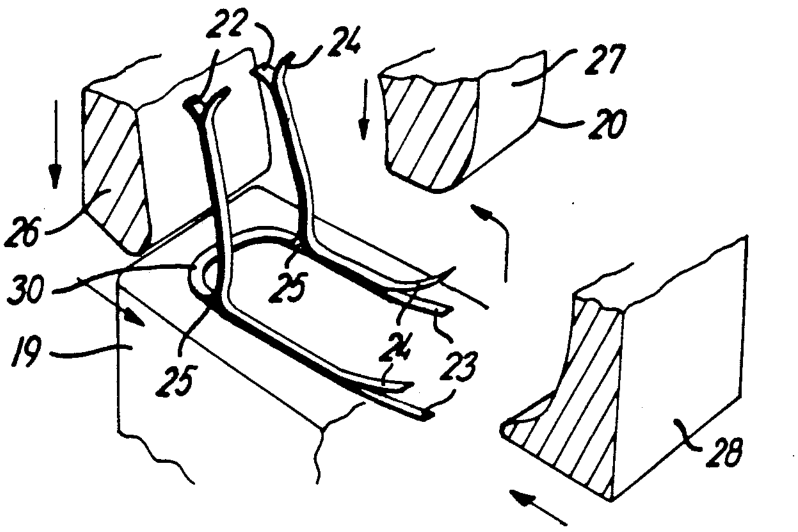
FIG. 5 is a front perspective view of laminae of the type made in FIG. 4 arranged in a press mold for producing a chair frame blank for a chair such as that shown in FIG. 1.
Figure 6:
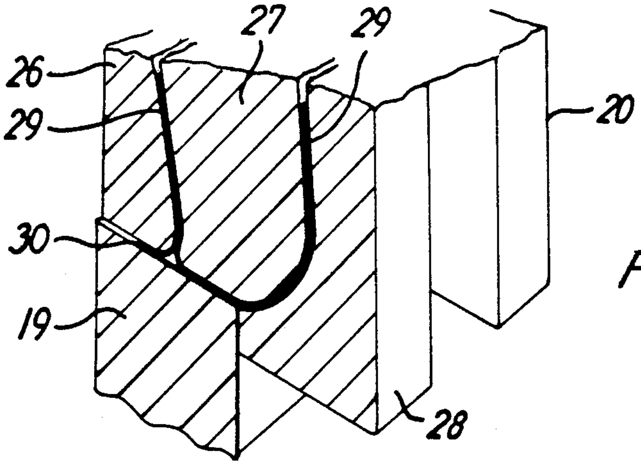
FIG. 6 is a front perspective view of the mold of FIG. 5 in its closed condition.
Figure 7:
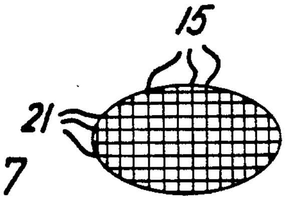
FIGS. 7 and 8 are enlarged scale, transverse cross-sectional views of the frame of the chair shown in FIG. 1.
Figure 8:
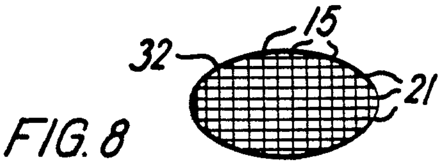
Figure 9:
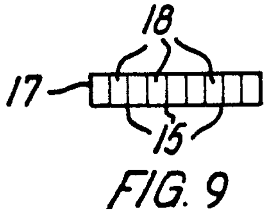
FIG. 9 is an enlarged cross-sectional view of the U-shaped member produced by the slicing operation illustrated in FIG. 4.

FIGS. 5 and 6 illustrate how the exposed frame portions 11 of the chair 10 shown in FIG. 1 may be made from U-shaped slices 17 as those shown in FIGS. 4 and 9. A suitable number of the U-shaped slices 17 are arranged on a base member 19 of a press tool or mold, which is generally designated by the reference numeral 20. The slices 17 are arranged in a stacked or mutually superimposed relationship with intermediate layers 21 (FIGS. 7 and 8) of a binder or glue. In the example shown in FIG. 5, the frame assembly comprises at least four separate slices, 17, including a lower slice 23, an upper, rear slice 22, and two, upper forward slices 24. The free end portions of the upper, rear slice 22 are bent upwards. The upper, forward slices 24 may be made from slices cut from a planar, wood laminate as that shown in FIG. 2, and are shown arranged in engagement with the free end portions of both upper rear slice 22 and lower slice 23. Triangular splines 25 may be inserted in the spaces formed where slices 22, 23 and 24 come together and join, and glue or binder is applied not only between the adjacent slices 22, 23 and 24 of the contacting surfaces of the splines 25. The laminate structure thus formed may be pressed into the desired shape by means of movable tool or press members 26, 27, and 28 which may be moved in directions indicated by the arrows in FIG. 5 into a closed position, as shown in FIG. 6. When the laminate structure has been pressed into the desired shape as shown in FIG. 6, the glue or binder is hardened. Thus, in case the binder is of the thermo-setting type, the structure may be heated in the tool, for example by high frequency heating. In the press tool 20, the free end portions of slices 22 and 23 are combined with laminate 24 so as to form leg portions 29, while the connecting or web portion 30 of slices 22 and 23 form the back 31 of the chair frame shown in FIG. 1. When the glue or binder has been set, the frame structure blank thus formed may be removed from the press tool 20 and the surface of the blank may be ground or machined to obtain a desired surface finish and/or cross-sectional shape, for example an elliptical shape as shown in FIG. 7. If desired, the surface of the frame structure produced may be covered by a layer of veneer 32 or by any other desired surface layer.

Figure 10:
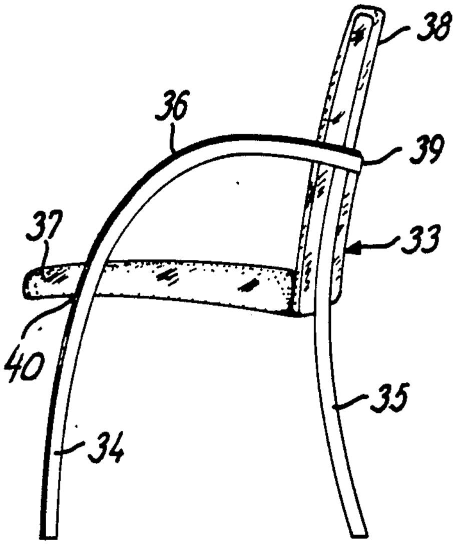
FIG. 10 is a second chair having frame parts made by the method according to the invention.

FIG. 10 shows a second embodiment 33 of a chair having forelegs 34, hind legs 35, arm rests 36, a seat 37 and a back 38. The upholstered seat 37 and back 38, as well as the curved hind legs 35, may be made by conventional furniture making methods. Thus, the back 38 may contain a curved inner wooden plate, but this plate as well as the hind legs 35 are of single curvature so that they may be shaped by using conventional methods. However, the oppositely arranged forelegs 34 and arm rests 36 are interconnected by a connecting part 39 extending behind the chair back 38 so that the forelegs, the arm rests and the connecting part form a single integral frame part 40 of double curvature. This frame part 40 of double curvature may be made by the method according to the invention.

Figure 11:
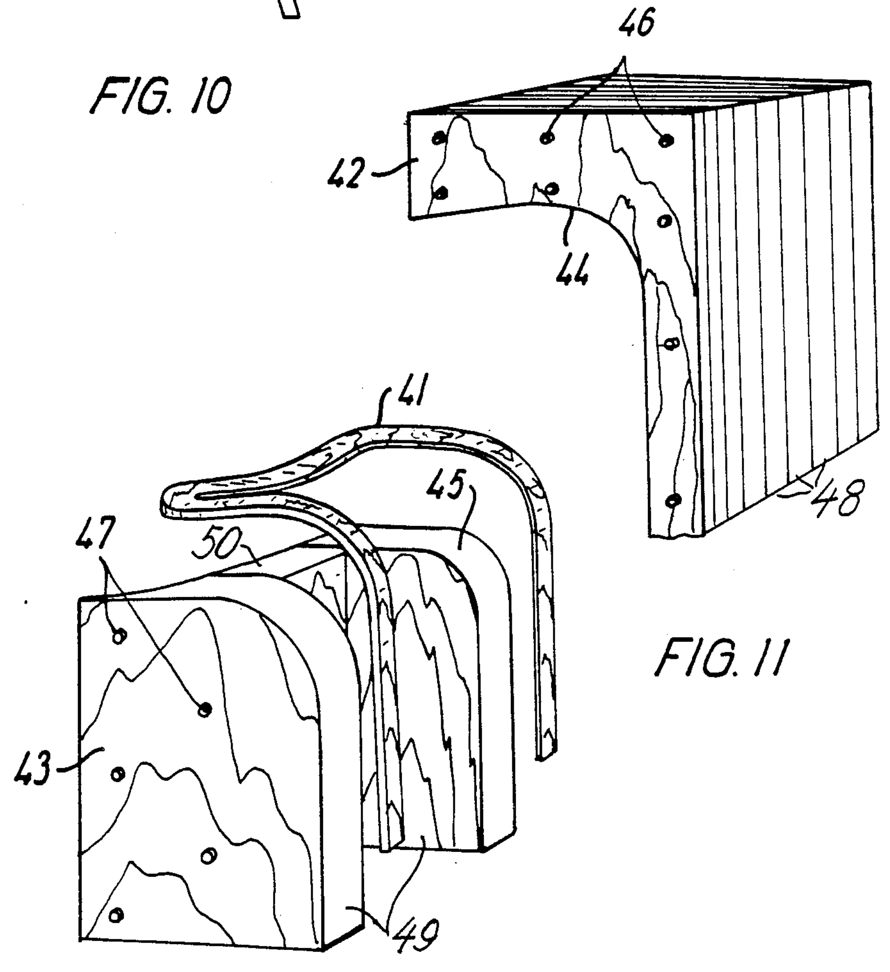
FIG. 11 illustrates a final bending and pressing process for making a chair frame blank for the chair shown in FIG. 10.

A chair frame blank 41 (FIG. 11) may be made from U-shaped slices 17 produced as described above with reference to FIGS. 2-4. FIG. 11 illustrates press tool parts 42 and 43 having shaping surfaces 44 and 45, respectively, which are complementary to the opposite outer surfaces of the frame blank 41. The tool part 42 is made from separate elements 48, while the tool part 43 is made from elements 49 and 50. These elements are clamped together by means of bolts 46 and 47 respectively. The frame blank 41 may be made by arranging a U-shaped laminate composed by U-shaped slices 17 and intermediate layers of a binder or glue between the shaping surfaces 44 and 45 of the press tool parts 42 and 43 as illustrated in FIG. 11. When the tool parts are moved to a closed position, the U-shaped laminate may be exposed to a high pressure, and the binder or glue may be set while the laminate is under pressure, for example, by heating the laminate by high frequency technique.

As mentioned above, the laminae 14 of the laminate 13 shown in FIG. 2 are preferably made from wood. However, for reasons of strength and/or in order to obtain a decorative surface pattern of the final product, some or all of the laminae may be made from other materials, such as metal or plastics material.

Two actual examples of chair frames manufactured in accordance with the present invention are set forth below.

EXAMPLE 1

A chair frame as that illustrated in FIG. 1 may be produced in the following manner. On the basis of a model or a drawing the accurate shape of the forming surfaces of a press mold used for shaping the U-shaped member 16 shown in FIG. 3 and the forming surfaces of the press mold or tool 20 shown in FIGS. 5 and 6 may be determined by using conventional CAD/CAM technique. A plane wood laminate is made from layers of veneer and intermediate layers of a thermosetting, two-component urea glue. The veneer thickness is selected in depending upon the degree of the subsequent bending, but may, for example, be 1-2 mm. The plane laminate thus produced is bent so as to form a U-shaped member as that shown in FIG. 3 in a conventional press tool or press mold. The U-shaped member is heated by a high frequency technique, while retained in the press mold under pressure, so as to set the glue. As an example, the spacing of the legs of the U-member may be about 380 mm.

When the U-shaped member has been removed from the press tool, the member is cut into U-shaped slices 17 by means of a rotating sawing or cutting tool comprising a shaft and a plurality of equidistantly spaced cutters mounted thereon. The cutting edges of the cutters may be provided with cutting diamonds, and the cutting tool may be rotated at a rotational speed of about 5000 rpm. By means of a cutting tool of the type described, the U-shaped member shown in FIG. 3 may be sliced so that smooth cutting surfaces, without miscoloration due to undue heating, are provided. The thickness of each of the U-shaped slices 17, which substantially corresponds to the spacing between adjacent cutters of the cutting tool, is chosen with regard to the degree of bending in the subsequent bending process. The thickness of the slices are, however, normally chosen in the range of 1-5 mm. The U-shaped slices 17 and wedge-shaped members or splines 25 are now arranged in a press tool or mold as that shown in FIGS. 5 and 6, and a thermosetting, two-component urea glue (Casco No. 1203) is applied to adjacent surfaces of the slices 17 and the splines 25. When the necessary number of slices have been arranged in the press tool 20, the tool members 26, 27 and 28 are moved to their closed position shown in FIG. 4, and a pressure of about 80 tons/$cm^2$ may be applied to the laminated sample for about 180-300 seconds. The sample is simultaneously heated by high frequency so as to set the glue while the sample is under pressure. After hardening of the glue, the sample is removed from the press tool, and may then be allowed to cool while supported by a supporting device having supporting surfaces which are complementary to the surfaces of the sample. The finished sample may then be arranged in a CNC (computer numeric control), five axes machining center, or in another computer controlled cutting machine, or the sample or blank may be finished by any other manner to obtain the desired final outer shape and finish of the furniture frame part to be produced.

EXAMPLE 2

A chair frame blank 41 as shown in FIG. 11 may be made by slicing a U-shaped member 16 (FIG. 3) as described in Example 1 above. The thickness of each of the wood laminae 14 in the laminate 13 (FIG. 2) may be 1-1.5 or 2 mm, and the thickness of each of the slices 17 (FIG. 4) may be 1-5 mm, preferably 1.5 mm. The slicing is made by means of a cutting device as that described in Example 1. The glue used for binding the slices 1 together to form the chair frame blank 41 is a thermo-setting, two-component urea glue, which is applied to the surface of the slices in an amount of 100-120 g/$m^2$. The pressure applied by the press tool parts 42 and 43 and the pressing and setting time, as well as the cooling procedure, are the same as described in Example 1. The chair frame blank 41 thus produced may be machined or otherwise processed so as to produce the frame part 40 with the desired shape and surface finish, for example in a CNC, five axes machining center.

In the foregoing description, it will be readily appreciated by those skilled in the art that modifications may be made to the invention without departing from the concepts disclosed herein. Such modifications are to be considered as included in the following claims, unless these claims by their language expressly state otherwise.

I claim:

1. A method for making wood furniture frames, and the like comprising:

providing a plurality of sheets of wood each having a longitudinally oriented grain, and being shaped to be bent in a direction generally transverse to the direction of the grain;

positioning the sheets in a generally overlying relationship, with the grain of each of the sheets oriented in the same general direction;

applying a curable adhesive between adjacent surfaces of the sheets;

bending the sheets with applied adhesive in a first direction generally transverse to the direction of the grain to form a predetermined shape;

curing the adhesive to form a solid laminate with the predetermined shape;

cutting the laminate in a direction generally parallel to the direction of the grain to form a plurality of formed strips;

positioning a plurality of the strips in an overlapping, non-planar relationship configured to form a selected furniture frame;

applying a curable adhesive between adjacent surfaces of the strips;

bending the strips with applied adhesive in a second direction generally transverse to the direction of the grain and different from said first direction to form a predetermined shape corresponding to the shape of the selected furniture frame; and curing the second named adhesive to form a solid laminated furniture frame having a three dimensional configuration.

2. A method for making a composite body, comprising:

providing a plurality of strips of wood each having a longitudinally oriented grain, and being shaped to be bent in a direction generally transverse to the direction of the grain;

fabricating a plurality of formed strip assemblies, comprising the steps of:

positioning at least two of the strips in a generally overlying relationship, with the grain of each of the strips oriented in the same general direction;

applying a curable adhesive between adjacent surfaces of the strips;

bending the strips with applied adhesive in a first direction generally transverse to the direction of the grain to form a predetermined shape;

curing the adhesive to form a solid laminate with the predetermined shape to form the strip assemblies;

positioning a plurality of the strip assemblies in an overlapping, non-planar relationship configured to form a selected furniture frame;

applying a curable adhesive between adjacent surfaces of the strip assemblies;

bending the strip assemblies with applied adhesive in a second direction generally transverse to the direction of the grain and different from said first direction to form a predetermined shape corresponding to the shape of the selected furniture frame; and curing the second named adhesive to form a solid laminated furniture frame having a three dimensional configuration.

3. A method of making a composite body, comprising:

forming a first laminate from mutually superposed first laminae of material and first intermediate layers of binding material, bending said first laminate while the first layers of binding material are in a non-hardened condition, so as to form one first curvature therein defined by first generatrices;

slicing said first bent laminate in a direction generally transverse to said first generatrices so as to produce a second laminae, forming a second laminate from said second laminae by mutually superposing the same with second intermediate layers of binding material, and bending said second laminate while the second layers of binding material are in a non-hardened condition, so as to form at least one second curvature in the second laminate defined by second generatrices which extend generally transverse to said first generatrices.

4. A method according to claim 3, wherein the direction of said slicing is substantially at right angles to said first generatrices.

5. A method according to claim 3, wherein said bending step disposes the second generatrices at right angles to the first generatrices.

6. A method according to claim 3, wherein:

said first laminae is constructed from a fibrous material with fibers therein oriented in a predetermined pattern;

positioning said first laminate such that the fibers thereof extend in substantially the same general direction, and wherein the first laminate is bent transversely to the direction of the fibers.

7. A method according to claim 6, wherein said bending step disposes the first laminate substantially at right angles to the direction of the fibers.

8. A method according to claim 6, wherein at least some of the first laminae are made from wood and the fibers comprising wood fibers.

9. A method according to claim 8, wherein the first laminate is sliced so as to produce the second laminae with a thickness of 1-5 mm each.

10. A method according to claim 9, wherein the said composite body is a furniture frame part.

11. A method of making a furniture frame part, comprising:

forming a first laminate from mutually superposed first laminae of material including wooden material having fibers extending in the same general direction and intermediate layers of a first layer of binding material;

bending said first laminate while the first layer of binding material is in a non-hardened condition in a direction transversely to the direction of the fibers so as to form at least one first curvature therein having first generatrices;

hardening the first layer of binding material;

slicing s id first laminate in a direction substantially parallel to the direction of the fibers so as to produce second laminae;

forming a second laminate from the second laminae by mutually superposing the same with intermediate layers of a second layer of binding material;

bending the second laminate while th second layer of binding material is in a non-hardened condition so as to form at least one second curvature therein having second generatrices extending generally transversely to said first generatrices; and hardening the second binding material.

12. A method according to claim 11, wherein said bending disposes the second generatrices substantially at right angles to the first generatrices.

13. A method according to claim 12, wherein the first laminate is sliced so as to produce the second laminae with a thickness of 1-5 mm each.

14. A method of making a composite body, comprising:

forming a first laminate from mutually superposed first laminae of material and first intermediate layers of binding material, bending said first laminate while the first layers of binding material are in a non-hardened condition, so as to form at least one first curvature therein defined by first generatrices;

slicing said first laminate in a direction substantially at right angles to said first generatrices, so as to produce a second laminae , forming a second laminate from said second laminae by mutually superposing the same with intermediate layers of a second layer of binding material, bending said second laminate while the second layer of binding material is in a non-hardened condition so as to form at least one second curvature in the second laminate defined by second generatrices which extend generally transverse to said first generatrices.

* * * * *

UNITED STATES PATENT AND TRADEMARK OFFICE
CERTIFICATE OF CORRECTION

PATENT NO. : 4,963,212

DATED : 10/16/90

INVENTOR(S) : Georg (NMI) Rasmussen

It is certified that error appears in the above-identified patent and that said Letters Patent is hereby corrected as shown below:

On the title page, delete [73] Assignee: Ploughman & Vingtoft, Copenhagen K. Denmark" should be --Unassigned--.

Signed and Sealed this

Nineteenth Day of May, 1992

*Attest:*

DOUGLAS B. COMER

*Attesting Officer*

*Acting Commissioner of Patents and Trademarks*